(12) United States Patent
Mabashi et al.

(10) Patent No.: US 9,315,132 B2
(45) Date of Patent: Apr. 19, 2016

(54) VEHICLE SEAT

(71) Applicant: Tachi-S Co., Ltd., Tokyo (JP)

(72) Inventors: Yohei Mabashi, Okazaki (JP); Makoto Miyabata, Okazaki (JP); Mutsuo Muramatsu, Tokai (JP); Kenichi Sugimoto, Nagoya (JP); Toshiki Igarashi, Anjo (JP); Masaaki Honda, Okazaki (JP); Kazuya Imayou, Anjo (JP); Yayoi Hirano, Okazaki (JP)

(73) Assignee: TACHI-S CO., LTD (JP)

( * ) Notice: Subject to any disclaimer, the term of this patent is extended or adjusted under 35 U.S.C. 154(b) by 0 days.

(21) Appl. No.: 14/246,200

(22) Filed: Apr. 7, 2014

(65) Prior Publication Data

US 2014/0300172 A1 Oct. 9, 2014

(30) Foreign Application Priority Data

Apr. 8, 2013 (JP) .................. 2013-080326

(51) Int. Cl.
*B60N 2/58* (2006.01)
*B60N 2/56* (2006.01)
*B60N 2/64* (2006.01)
*B60N 2/02* (2006.01)

(52) U.S. Cl.
CPC ............ *B60N 2/5685* (2013.01); *B60N 2/0284* (2013.01); *B60N 2/5825* (2013.01); *B60N 2/646* (2013.01); *B60N 2205/30* (2013.01)

(58) Field of Classification Search
CPC .................................................. B60N 2/5685
USPC .................. 297/180.12, 217.3, 452.6
See application file for complete search history.

(56) References Cited

U.S. PATENT DOCUMENTS

| 4,558,905 | A * | 12/1985 | Natori .................. 297/452.6 |
| 4,695,091 | A * | 9/1987 | Altmann et al. ......... 297/180.12 |
| 6,733,072 | B2 * | 5/2004 | Jaillet et al. ............. 297/180.13 |
| 8,511,754 | B2 * | 8/2013 | Leponce et al. ......... 297/452.38 |
| 8,701,816 | B2 * | 4/2014 | Saitoh ..................... 180/273 |
| 2002/0093236 | A1 * | 7/2002 | Inoue ...................... 297/452.48 |
| 2012/0049586 | A1 * | 3/2012 | Yoshimoto et al. ...... 297/180.12 |
| 2012/0228903 | A1 * | 9/2012 | Abe et al. ................. 297/180.12 |

FOREIGN PATENT DOCUMENTS

| JP | 2003-291708 A | 10/2003 |
| JP | 2004-350827 A | 12/2004 |
| JP | 2012-34719 A | 2/2012 |

* cited by examiner

*Primary Examiner* — Peter Brown
(74) *Attorney, Agent, or Firm* — Cantor Colburn LLP

(57) ABSTRACT

A part of the planar member, which is defined by the slits and extends over the center groove made in a seat pad, serves as a bridge part. As the sewn part of a trim cover is pulled into the groove, the bridge part is pressed onto the sewn part of the trim cover and pulled into the groove, together with the sewn part, and is bend in the form like letter U and held in the groove. The groove defines a through hole penetrating the seat pad at the bridge part of the planar member. The bridge part is not pressed onto the bottom of the groove even if the seat pad undergoes compressive deformation and is pressed down in the groove, because the groove has no bottom at some parts.

1 Claim, 4 Drawing Sheets

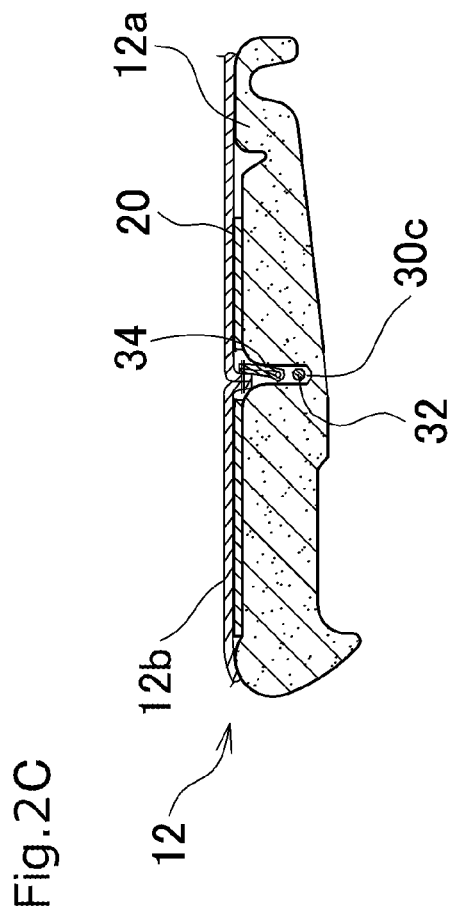

VEHICLE SEAT

CROSS-REFERENCE TO RELATED APPLICATIONS

This application is based upon and claims the benefit of priority from the prior Japanese Patent Application No. 2013-080326, filed Apr. 8, 2013, the entire contents of which are incorporated herein by reference.

BACKGROUND OF THE INVENTION

1. Field of the Invention

This invention relates to a vehicle seat, which comprises a seat pad, a trim cover and a planar member, such a heater mat or a sensor mat, located between the seat pad and the trim cover.

2. Description of the Related Art

Vehicle seats are known, each having a planar member such as a heater mat or a sensor mat. The planar member is on a seat cushion or a seat back, or on both, located between a seat pad (cushion member) made of foamed material such as foamed urethane, and a trim cover (surface layer) covering the seat pad.

Most seat pads have grooves (i.e., pulling-over grooves) each, which are cut in the upper surface. The grooves have an almost rectangular cross section, and extend in the front-to-aft direction and left-to-right direction of the vehicle. Below one of the grooves, a suspension wire is embedded in the seat pad, and the planar member has slits cut in alignment with said groove of the seat pad. A suspender is sewn to the trim cover, hangs down to the groove through the slits and is coupled to the suspension wire. The suspender is pulled, pulling that part of the trim cover, which is sewn to it, into the groove. So pulled and stretched, the trim cover assumes a desirable outer appearance (Refer to, for example, JP 2004-350827A).

The sewn part of the trim cover is pulled into the grooves of the seat pad, that part (i.e., bridge part of the planar member, which has no slits and extent over the grooves), is pushed to the sewn part of the trim cover. As a result, said part of the planar member is pulled into the groove, together with the sewn part of the trim cover, is bent and shaped like letter U, and is held in the grooves.

As a person gets seated, a load is applied to the seat. The seat pad is therefore bent, undergoing compressive deformation. As the seat pad undergoes compressive deformation, the trim cover expands. However, the planar member, which is composed of a flexible film embedding a heater wire, a sensor mat wire, etc., is poor in elasticity. Inevitably, the bridge part of the planar member is pushed downwards onto the bottom of the groove made in the seat pad, and the seat pad undergoes compressive deformation. So pushed, the bridge part warps and may be broken. If this happens, the heater wire and the sensor mat wire may be cut at the bridge part.

JP 2003-291708A discloses a configuration, in which cut pieces made of polyethylene terephthalate (PET) and therefore thin and able to slide and having elastic force, are bonded to the bridge part of the planar member. The cut pieces therefore render the planar member thicker, enable the planar member to slide more readily, and imparts a larger elastic force to the planar member. In this configuration, the seat pad receives a load and undergoes compressive deformation as a person gets seated. Then, the planar member slides outwards and upwards from the grooves, and warps at its greater part. Therefore, the planar member is pulled less into the grooves, preventing the bridge part from being pushed onto the bottoms of the grooves and, hence, from being broken.

JP 2012-034719A describes a bridge part held in groove, in the form of U, while clamped with a fastening member fitted in the groove. The bridge part is therefore prevented from being pushed onto the bottom of the groove and, hence, from being broken.

In the configuration disclosed in JP 2003-291708A, the cut pieces are bonded to the bridge part of the planar member. Inevitably, the number of components increases, and an additional step of bonding the cut pieces to the bridge part must be performed. Further, the planar member slides above the groove and outward from the grooves, and a greater part of the planar member warps and is pulled into the grooves but insufficiently. Unless the planar member sufficiently slides to warp at its greater part, its bridge part cannot be prevented from being pushed onto the bottoms of the grooves or from being ultimately broken. Consequently, the heater wire will probably be broken.

In the configuration disclosed in JP 2012-034719A, the bridge part of the planar member is secured by fastening members fitted in the grooves. Therefore, the bridge part is not pushed onto the bottoms of the grooves. However, any part of the bridge part, which is not so secured, may be bent and broken. Further, the number of components increases (due to the use of the fastening members). Still further, an additional step of holding the bridge part with the fastening members must be performed, inevitably rendering the manufacture procedure more complex.

BRIEF SUMMARY OF THE INVENTION

An object of this invention is to provide a vehicle seat, which can be manufactured without an increase in the number of components and without making the manufacture procedure complex, and in which the heater wire and the like can be reliably prevented from be cut even if the bridge part of each planar member is broken.

In this invention, though holes are made in the groove. The through holes penetrate the seat pad, at the positions where the bridge part of the planar member extends over the groove.

According to this invention, a vehicle seat comprises a seat pad comprising grooves, cut in an upper surface of the seat pad and extending in a specific direction; a suspension wire embedded in the seat pad below the grooves and bent around the groove; a trim cover covering the seat pad and having a suspender sewn to the trim cover; a planar member located between the seat pad and the trim cover; wherein slits are cut in the planar member in alignment with the grooves and those parts of the planar member which extend over the grooves serve as bridge parts; those parts of the grooves over which the bridge parts extend provide through holes of the seat pad and have no bottom, and any other part of the groove is a bottomed groove of the seat pad; and the suspender of the trim cover hangs down into the grooves through the slits, is fastened to the suspension wire, is pulled into the grooves and thereby stretches the trim cover.

BRIEF DESCRIPTION OF THE DRAWINGS

FIG. 2C is a sectional view of the seat cushion, taken along line 2C-2C shown in FIG. 2A.

FIG. 3A' is a sectional view of part 3A of the seat cushion (FIG. 2B), to which a load is applied as a person is seated.

DETAILED DESCRIPTION OF THE INVENTION

An embodiment of the invention will be described in detail, with reference to the accompanying drawings.

Figure 2A:
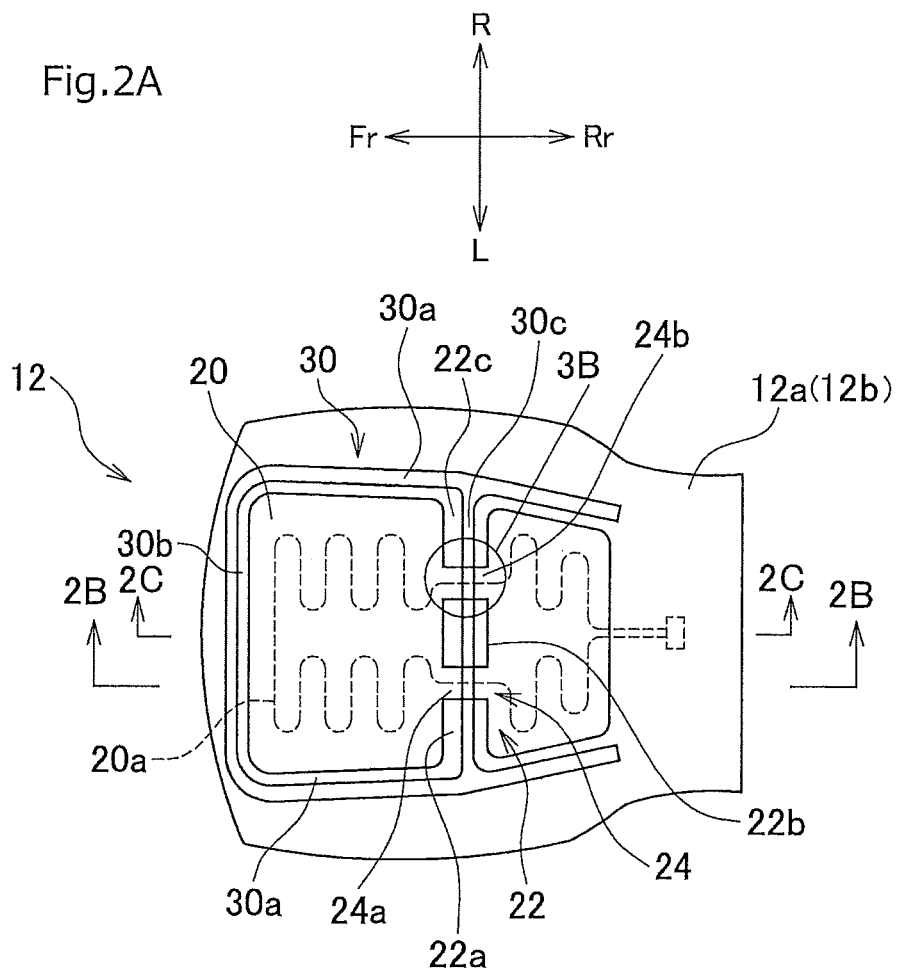
FIG. 2A is a plan view of a seat cushion, showing all parts of the cushion, but the trim cover.

In FIG. 2A, arrows Fr and Rr indicate the forward and rearward directions for the person in the driver's seat, as viewed from above.

Figure 1:
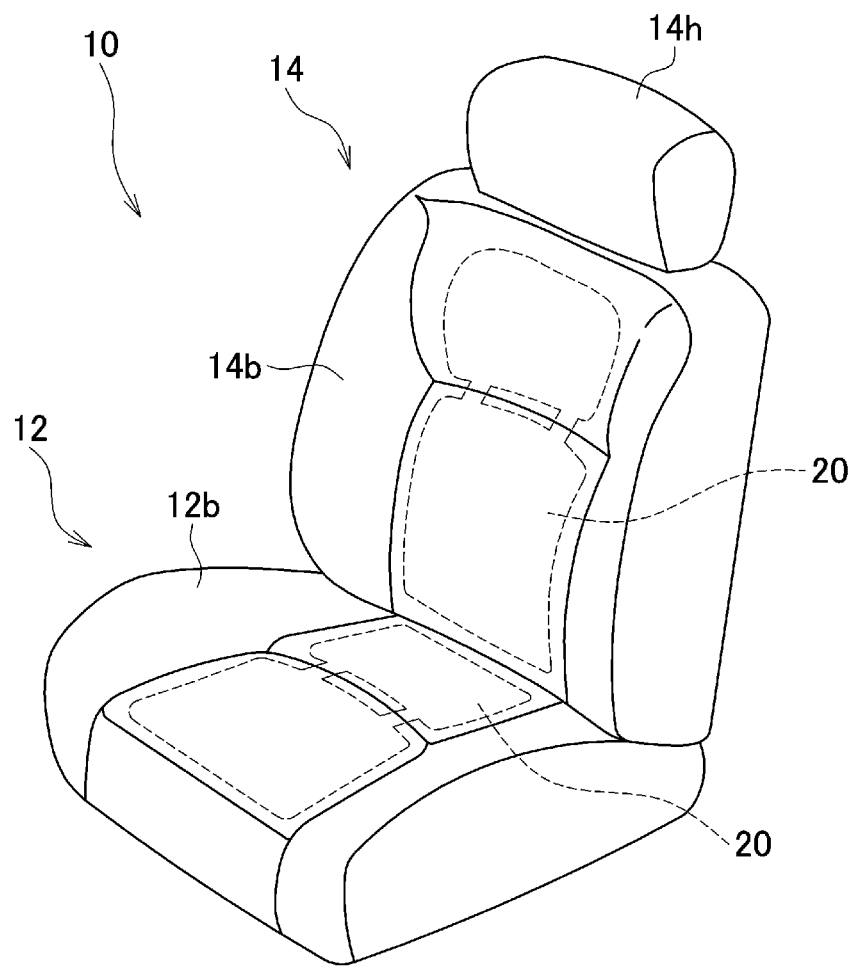
FIG. 1 is a perspective view of a vehicle seat, according to an embodiment of this invention.

As shown in FIG. 1, a vehicle seat 10 comprises a seat cushion 12 and a seat back 14. The seat back 14 is secured to the rear end of the seat cushion 12 and can incline with respect to the seat cushion. A head rest 14h is provided on the top of the seat back 14, and can be moved up and down.

The seat cushion 12 and the seat back 14 have basic structures that are well known in the art. That is, the seat cushion 12 is composed of a seat frame (i.e. skeleton, not shown), a seat pad (cushion member) 12a made of foamed material such as foamed urethane and laid on the seat frame, and a gas-permeable trim cover (i.e., surface layer) 12b covering the seat pad 12a. Similarly, the seat back 14 is composed of a base frame, a seat pad (not shown), and a gas-permeable trim cover 14b covering the seat pad.

Planar members 20, such as a heater mat and a sensor mat, are laid on the seat cushion 12 and the seat back 14, respectively. Each planar member 20 is located between the seat pad and the trim cover and is composed of a flexible film embedding heater wire, a sensor mat wire, etc. In the embodiment, the planar members 20 are heater mats, each having a meandering heater wire 20a embedded in the entire surface.

Figure 2B:
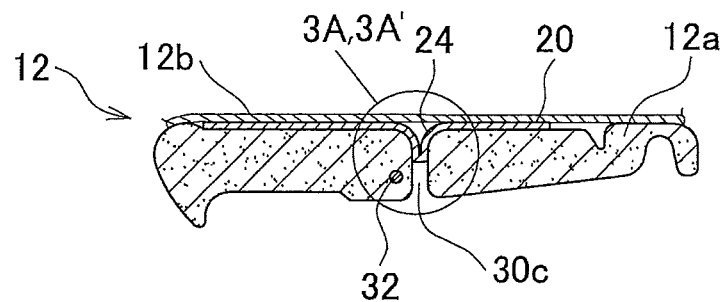
FIG. 2B is a sectional view of the seat cushion, taken along line 2B-2B shown in FIG. 2A.
Figure 3A:
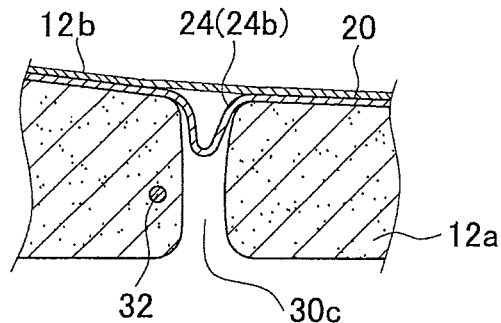
FIG. 3A is a sectional view of part 3A of the seat cushion (FIG. 2B), to which no load is applied.
Figure 3A:
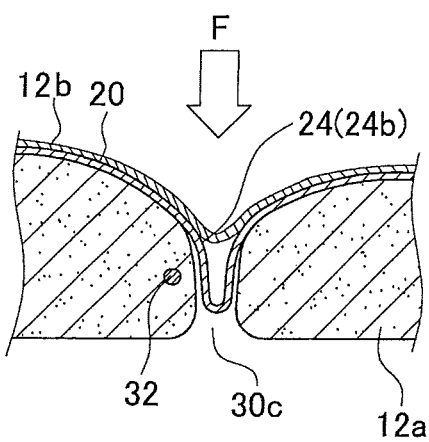

The planar member (heater mat) 20 laid on the seat cushion 12 will be described. As shown in FIGS. 2A, 2B and 3A (not illustrating the trim cover for simplicity), grooves 30 (pulling-over grooves) having an almost rectangular cross section are cut in the upper surface of the seat pad 12a, and extend in the front-to-aft direction and left-to-right direction of the vehicle seat. Slits 22 are cut in alignment with the grooves made in that part of the seat pad 12a, which is middle in the front-to-aft direction. That is, a pair of grooves 30a is made in the upper surface of the seat pad, at the left and right parts thereof, and extends in the front-to-aft direction. Further, a groove 30b is made of in the part of the seat pad, which lies front and a groove 30c is made in that part of the seat pad, which lies almost middle in the front-to-aft direction, and communicates respectively at ends with the grooves 30a cut in the left and right parts of the seat pad 12a.

Since the slits 22 are cut in the planar member 20, those parts of the planar member, which extend over the grooves 30 serve as bridge parts 24. In the embodiment, three slits 22a, 22b and 22c are cut in the planar member 20. As a result, two bridge parts 24a and 24b are provided, positioned symmetric to each other in the left-to-right direction of the vehicle seat, both extending over the groove 30c cut in the middle part of the seat pad. Although the slits 22 divide the planar member 20 into a front part and a rear part, the heater wire 20a remains electrically intact, because one part is arranged on one bridge part 24a and another part on the other bridge part 24b.

A suspension wire 32 is formed integral with, and embedded in the seat pad 12a, below the grooves 30 (i.e., grooves 30a, 30b and 30c).

In the present invention, of the groove 30c, those parts over which the bridge parts 24 extend penetrate those parts of the seat pad, which serve as bridge parts 24. Any other part of the groove 30 is a bottomed groove, as shown in FIG. 2C, as in the conventional vehicle seat.

Figure 3B:
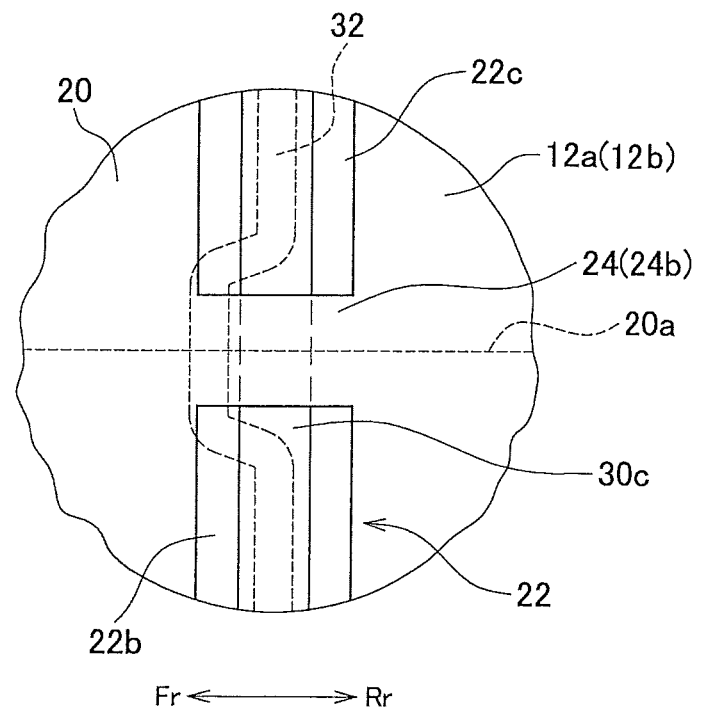
FIG. 3B is an enlarged plan view of part 3B of the seat cushion shown in FIG. 2A.

In any part of the seat pad 12a, the groove 30c passes through, or any part at which a bridge part 24 extends over the groove 30c, the suspension wire 32 does not lie below the groove 30c. Instead, as shown in FIG. 3B, the suspension wire 32 is bent around the groove 30c in the embodiment.

A suspender 34 sewn to the trim cover 12b hangs down into the grooves 30 through the slits 22 cut in the planar member 20. The suspender 34 is fastened to the suspension wire 32 with a clip, and that part of the trim cover 12b, which is sewn to the suspender 34, is pulled into the grooves 30, in the same manner as described in, for example, JP 2004-350827A. The trim cover 12b is thereby stretched.

Once the sewn part of the trim cover is pulled into the center groove 30c of the seat pad, the bridge part 24 (24b) extending over the groove 30c is pressed onto the sewn part of the trim cover and also pulled into the groove 30c, together with the sewn part of the trim cover. As a result, the bridge part 24 is bent in the form like letter U and held in the center groove 30c as illustrated in FIG. 3A.

As a person gets seated, a load F is applied to the seat cushion as shown in FIG. 3A'. The seat pad 12a therefore undergoes compressive deformation. As the seat pad 12a is so deformed, the bridge parts 24 of the planar member are pushed toward the lower part of the groove 30c cut in the seat pad. Nonetheless, the bridge parts 24 smoothly lower, receiving no resistance, because those parts of the groove 30c, over which the bridge parts 24 extend, provide through holes and have no bottom. Hence, the bridge parts 24 will not be pushed onto the bottom of the groove so hard to be broken. This reliably prevents the heater wire 20a from being cut.

The seat pad 12a may be made so thick that the bridge parts 24 would not be pressed onto the bottom of the groove 30c even if they are pushed downward as the seat pad 12a undergoes compressive deformation. In this case, the groove 30c may be a bottomed one, not a groove shaped like a through hole.

The suspension wire 32 is bent around that part of the groove 30c, which serves as a through hole and over which the bridge part 24 extends. Therefore, the bridge part 24 will not be pushed onto the suspension wire 32 to be broken.

Through holes are need to be provided at only a few parts of the groove 30c made in the seat pad 12a (i.e., parts over which the bridge parts 24 of the planar member extend). This avoids an increase in the number of components. Further, since the grooves are made in the seat pad, it is not difficult to make a part of any grooves serve as a through hole without bottom, not rendering the manufacture procedure complex at all.

As has been described, the seat pad has through holes at the bridge parts of the planar member in the present invention. Therefore, the bridge parts are never pushed onto the bottom of the groove to be broken. Since the bridge parts remain intact, the heater wire would not be cut at all. In addition, the number of components would not increase because a part of any groove serves as a through hole. Nor will the manufacture procedure become more complex.

The present invention is not limited to the embodiment described above. Various changes and modifications can be made within the scope of the invention, and will of course fall within the scope of the invention.

For example, the planar member located between the seat pad and the trim cover is not limited to a heater mat or a sensor mat.

In the embodiment, the planar member has two bridge parts, positioned symmetric to each other in the left-to-right direction of the vehicle seat, both extending over the groove 30c cut in the middle part of the seat pad. Nonetheless, the bridge parts are not limited in number or position. Moreover, if the planar member is laid over not only the center groove 30c, but also the grooves 30a and 30b, those parts of the grooves, over which the bridge parts extend, may serve as through holes.

What is claimed is:

1. A vehicle seat, comprising:
    a seat pad comprising a groove, cut in an upper surface of the seat pad and extending in a specific direction; a plurality of spaced through holes provided at a bottom of the groove and extending down through a bottom surface of the seat pad;
    a suspension wire embedded in the seat pad below the groove and bent around the spaced through holes;
    a trim cover covering the seat pad and having a suspender sewn to the trim cover;
    a planar member located between the seat pad and the trim cover;
wherein
    slits are cut in the planar member in alignment with the grooves and those parts of the planar member which extend over the groove serve as bridge parts and are aligned with the spaced through holes; and
    the suspender of the trim cover hangs down into the grooves through the slits, is fastened to the suspension wire, is pulled into the grooves and thereby stretches the trim cover, wherein the bridge parts extend down into the grooves but, due to the through holes, do not contact the bottom of the groove.

* * * * *